US012808894B2

(12) United States Patent
Fukaya et al.

(10) Patent No.: US 12,808,894 B2
(45) Date of Patent: Nov. 24, 2026

(54) AUTOMATIC ANALYZER

(71) Applicant: Hitachi High-Tech Corporation, Tokyo (JP)

(72) Inventors: Masashi Fukaya, Tokyo (JP); Masashi Akutsu, Tokyo (JP); Naoto Suzuki, Tokyo (JP); Maki Furukawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 514 days.

(21) Appl. No.: 18/286,497

(22) PCT Filed: Apr. 22, 2022

(86) PCT No.: PCT/JP2022/018574
§ 371 (c)(1),
(2) Date: Oct. 11, 2023

(87) PCT Pub. No.: WO2022/244597
PCT Pub. Date: Nov. 24, 2022

(65) Prior Publication Data

US 2024/0201215 A1 Jun. 20, 2024

(30) Foreign Application Priority Data

May 18, 2021 (JP) ................................ 2021-083767

(51) Int. Cl.
*G01N 35/10* (2006.01)

(52) U.S. Cl.
CPC ..... *G01N 35/1002* (2013.01); *G01N 35/1009* (2013.01)

(58) Field of Classification Search
CPC .......... G01N 35/1002; G01N 35/1009; G01N 35/00613; G01N 2035/00673
See application file for complete search history.

(56) References Cited

U.S. PATENT DOCUMENTS

2020/0191816 A1* 6/2020 Onuki ............... G01N 35/1002

FOREIGN PATENT DOCUMENTS

| | | | |
|---|---|---|---|
| JP | 2000131324 A | * | 5/2000 |
| JP | 2010-60441 A | | 3/2010 |
| JP | 2015-10863 A | | 1/2015 |

OTHER PUBLICATIONS

Espacenet English Translation of JP2000131324A. (Year: 2000).*
(Continued)

*Primary Examiner* — Kathryn Elizabeth Limbaugh
(74) *Attorney, Agent, or Firm* — Crowell & Moring LLP

(57) ABSTRACT

[Problem] To provide an automatic analyzer capable of reducing dispensing accuracy defect caused by reagent adhered or concentrated in measuring a sample as compared with a prior art.
[Solution] A control computer 24 of an automatic analyzer 100 executes analysis while switching a reagent used according to an analysis item, and, when a predetermined condition is fulfilled during an analysis operation, controls reagent dispensing mechanisms 11, 13 to execute a conditioning operation of lowering reagent nozzles 12, 14 to pass through an aspiration port of a reagent container 4 of a target and lifting the reagent nozzles 12, 14.

13 Claims, 15 Drawing Sheets

(56) References Cited

OTHER PUBLICATIONS

International Preliminary Report on Patentability (PCT/IB/338 & PCT/IB/373) issued in PCT Application No. PCT/JP2022/018574 dated Nov. 30, 2023, including English translation of Written Opinion (PCT/ISA/237) (5 pages).
International Search Report (PCT/ISA/210) issued in PCT Application No. PCT/JP2022/018574 dated Jul. 12, 2022 with English translation (4 pages).
Japanese-language Written Opinion (PCT/ISA/237) issued in PCT Application No. PCT/JP2022/018574 dated Jul. 12, 2022 with English translation (6 pages).
Extended European Search Report issued in European Application No. 22804511.8 dated Apr. 9, 2025 (10 pages).

* cited by examiner

FIG. 6B
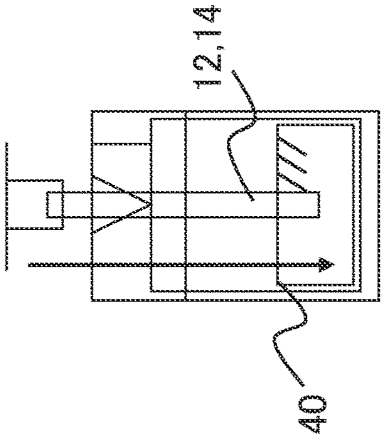
FIG. 6D
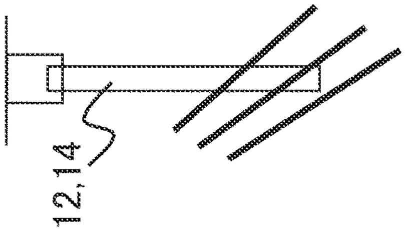
FIG. 6A
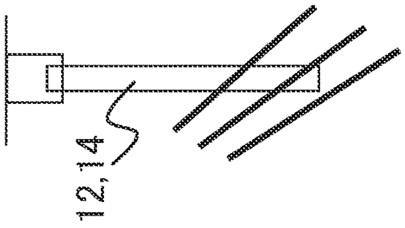
FIG. 6C
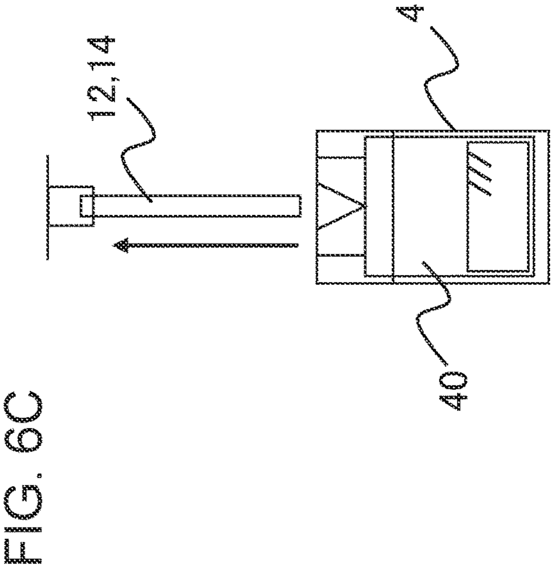

FIG. 11

| |
|---|
| REAGENT CONTAINER IDENTIFICATION CODE XXXXXXX |

| | |
|---|---|
| REAGENT CONTAINER IDENTIFICATION CODE | XXXXXXX |
| INTERVAL TIME | YY |
| CONDITIONING TIMING | R1 |

FIG. 12

| POSITION 1 | POSITION 2 |
|---|---|
| REAGENT CONTAINER IDENTIFICATION CODE XXXXXXX | |

| | |
|---|---|
| REAGENT CONTAINER IDENTIFICATION CODE | XXXXXXX |
| POSITION 1 INTERVAL TIME | Y1 |
| POSITION 1 CONDITIONING TIMING | R1 |
| POSITION 2 INTERVAL TIME | Y3 |
| POSITION 2 CONDITIONING TIMING | R3 |

FIG. 13

| SCHEDULE SELECTION INFORMATION | | | |
|---|---|---|---|
| TIMING | R1 | R2 | R3 |
| NUMBER OF TIMES OF OPERATION | 1 | 0 | 0 |

FIG. 14

| SCHEDULE SELECTION INFORMATION | | | |
|---|---|---|---|
| TIMING | R1 | R2 | R3 |
| NUMBER OF TIMES OF OPERATION | 1 | 0 | 1 |

AUTOMATIC ANALYZER

TECHNICAL FIELD

The present invention relates to an automatic analyzer that measures a concentration or an activity value of a target component in a sample including multiple components such as blood or urine.

BACKGROUND ART

As an example of an automatic analyzer in which, even when a portion in the vicinity of a liquid level of a reagent in a reagent container deteriorates or a concentration gradient of the reagent in the reagent container occurs, the reagent can be effectively used to minimize an increase in dead volume of the reagent, PTL 1 describes an automatic analyzer that analyzes a sample using a reagent of a reagent container, the automatic analyzer including a measurement information generation unit configured to store a standard immersion amount of an aspiration tool when a pipette as the aspiration tool is lowered to aspirate a reagent of a reagent container and is immersed from a reagent liquid level and at least one immersion amount for reagent abnormality detection that is more than the standard immersion amount and, when a measurement request for reagent quality control or calibration is given, configured to add measurement by dispensing of the reagent using the immersion amount for reagent abnormality detection in addition to measurement by dispensing of the reagent using the standard immersion amount.

CITATION LIST

Patent Literature

PTL 1: JP2015-10863A

SUMMARY OF INVENTION

Technical Problem

The automatic analyzer is a device that analyzes a biological sample such as blood, urine, or spinal fluid and is described in, for example, PTL 1.

The automatic analyzer has functions of dispensing a sample and a reagent from respective storage containers into a reaction container using a sample dedicated dispensing mechanism to which a sample nozzle is attached and a reagent dedicated dispensing mechanism to which a reagent nozzle is attached, stirring the mixed liquid of the sample and the reagent, measuring a change in color tone of the reaction solution using a photometer, and outputting a quantification result of a target material in the sample based on the measured data.

The storage container of the sample or the reagent has various shapes and may have a shape where an aspiration port that a nozzle accesses for aspiration is narrow. In particular, in order to suppress the effect of concentration by evaporation or the effect of contact with air to improve storage stability, the storage container of the reagent is desired to have the shape where the aspiration port is narrow.

In addition, the storage container of the reagent is repeatedly used for analysis until the liquid amount of the reagent filled reaches a predetermined amount (dead volume). The reagent container where the liquid amount reaches the dead volume is discharged from the device and discarded.

In the automatic analyzer, even when a measurement interval is empty, in a case where the same sample and the same reagent are used, one important requirement is to output data with constantly stable accuracy.

For a recent automatic analyzer, in order to deal with various test items, it is required to handle a wide variety of samples and reagents. In addition, a reduction in reagent running cost by a reduction in liquid amount is required, whereas the accuracy and the long-term stability of data to be output are more strictly required. In order to satisfy these requirements, for the dispensing mechanism of the automatic analyzer, not only the dispensing accuracy of the repeated dispensing but also the stability of daily data when the interval is empty or day-to-day data across days are required.

In the automatic analyzer, the step of sample measurement starts from a timing at which a user sets the sample to the device. That is, the measurement interval of the sample varies depending on a timing at which the sample is loaded on the device on the user side. In addition, a measurement item to be requested for each sample varies depending on purposes such as a medical check-up or a patient's clinical condition. Due to this reason, the use frequency of the reagent container loaded in the automatic analyzer also varies depending on a user's operation, a patient's clinical condition, and an inspection purpose.

In a reagent container having a narrow entrance, when a reagent nozzle is lowered to the reagent container to aspirate the reagent and is subsequently lifted after the reagent aspiration, the reagent attached to the outer side of the nozzle may be attached to the container entrance.

When it is difficult to enter the next measurement where the reagent in the reagent container is to be used after using the reagent container, there is concerned that the reagent attached to the container entrance is dried and concentrated over time, and a characteristic change such as an increase in viscosity or crystallization may occur.

In particular, depending on reagent components, the dried and concentrated reagent may be adhered in a crystalline or film-like state. The adhered reagent may be drawn into an inner side or an outer side of the nozzle during the next aspiration. When the reagent is discharged to the reaction container in this state, the reagent where the concentration of the adhered component is high is mixed with the reaction solution, which may affect the reaction speed of the sample and the reagent.

When this phenomenon occurs, a change that is different from a change in absorbance assumed from the original sample concentration occurs, and the measured value may be an abnormal value. It is considered that this problem is significant in an analysis item that is sensitive to the reagent dispensing accuracy, and the abnormal value may be generated due to the phenomenon.

Under these circumstances, it is required to take a countermeasure against the concentrated or adhered reagent.

The present invention provides an automatic analyzer capable of reducing a decrease in dispensing accuracy caused by an adhered or concentrated reagent during sample measurement as compared to the related art.

Solution to Problem

The present invention includes a plurality of means for solving achieving the above-described object. For example, provided is an automatic analyzer allowing a sample and a reagent to react with each other and measuring a property of a reaction solution obtained by the reaction, the automatic analyzer including: a dispensing mechanism including a nozzle that aspirates and discharges the reagent; a storage storing a reagent container filled with the reagent; and a control unit controlling an operation of the dispensing mechanism, in which the control unit executes analysis while switching the reagent used according to an analysis item, and, when a predetermined condition is fulfilled during an analysis operation, controls the dispensing mechanism to execute a conditioning operation of lowering the nozzle to pass through an aspiration port of a target reagent container and lifting the nozzle.

Advantageous Effects of Invention

According to the present invention, a decrease in dispensing accuracy caused by an adhered or concentrated reagent during sample measurement can be reduced as compared to the related art. Objects, configurations, and effects other than those described above will be clarified by describing the following embodiment.

BRIEF DESCRIPTION OF DRAWINGS

FIGS. 6A to 6D are basic schematic drawings of a conditioning operation of the automatic analyzer of the embodiment.

FIG. 11 is a drawing showing an example of setting of conditioning information in the automatic analyzer of the embodiment.

FIG. 12 is a drawing showing another example of setting of conditioning information in the automatic analyzer of the embodiment.

FIG. 13 is a drawing showing an example of selection of conditioning operation timing information in the automatic analyzer of the embodiment.

FIG. 14 is a drawing showing an example of selection of conditioning operation timing information in the automatic analyzer of the embodiment.

DESCRIPTION OF EMBODIMENTS

Figure 1:
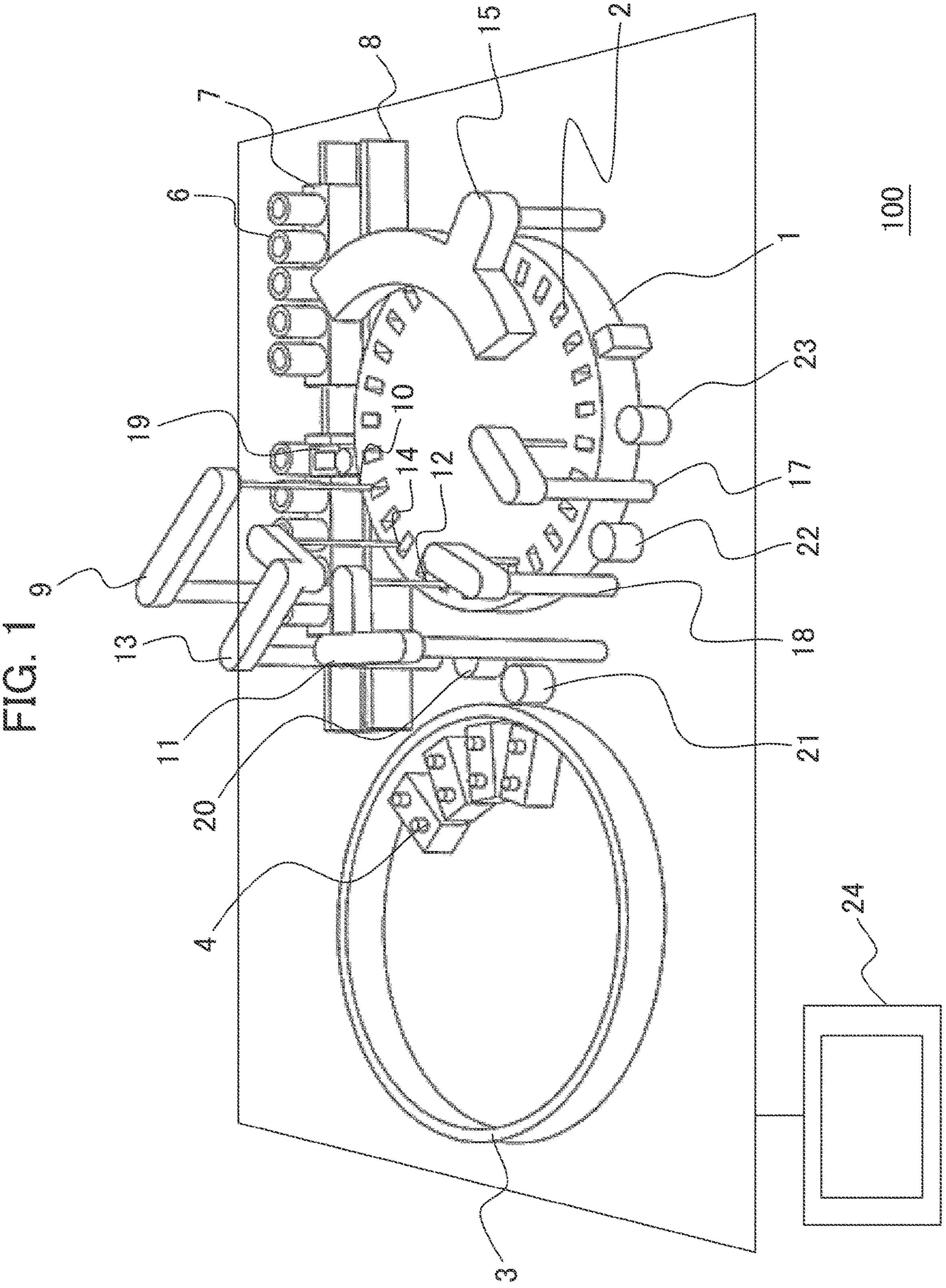
FIG. 1 is a schematic drawing of an automatic analyzer of an embodiment of the present invention.

An embodiment of an automatic analyzer according to the present invention will be described using FIGS. 1 to 23. In the drawings used in the present specification, the same or corresponding components are represented by the same or similar reference numerals, and the description of these components will not be repeated.

Figure 2:
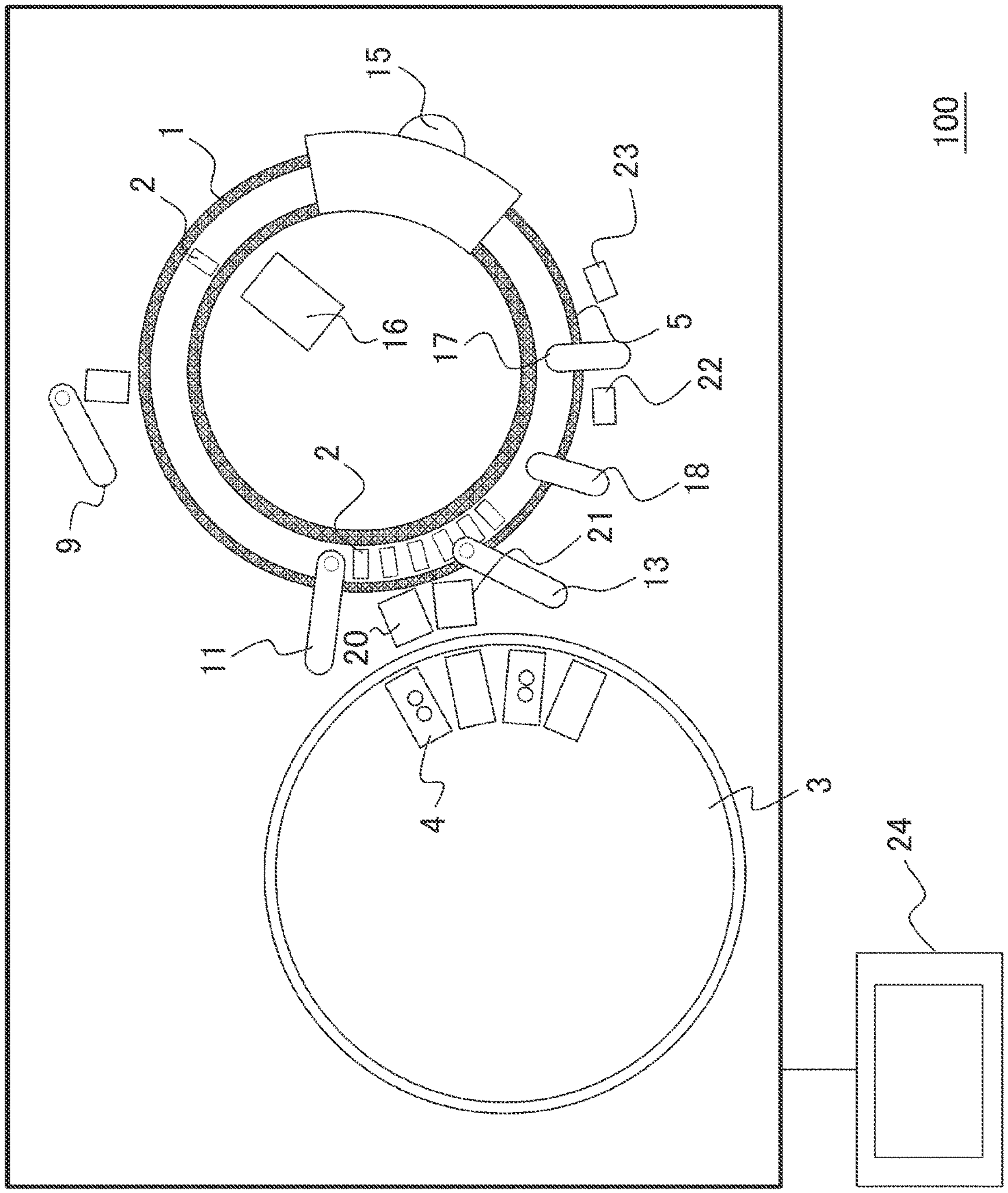
FIG. 2 is a schematic drawing of the upper surface of the automatic analyzer of the embodiment.
Figure 3:
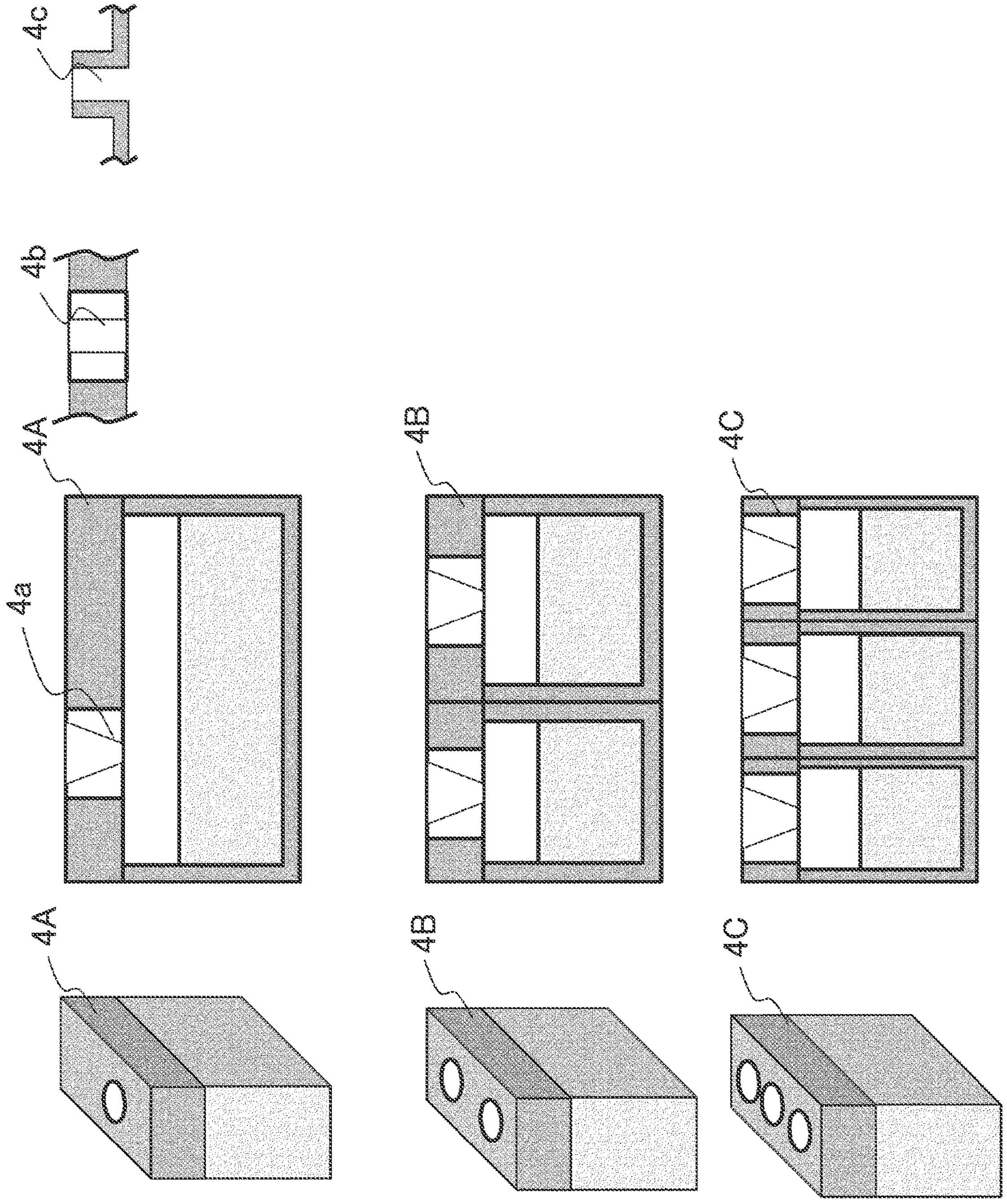
FIG. 3 is a schematic drawing of a reagent container used in the automatic analyzer.
Figure 4:
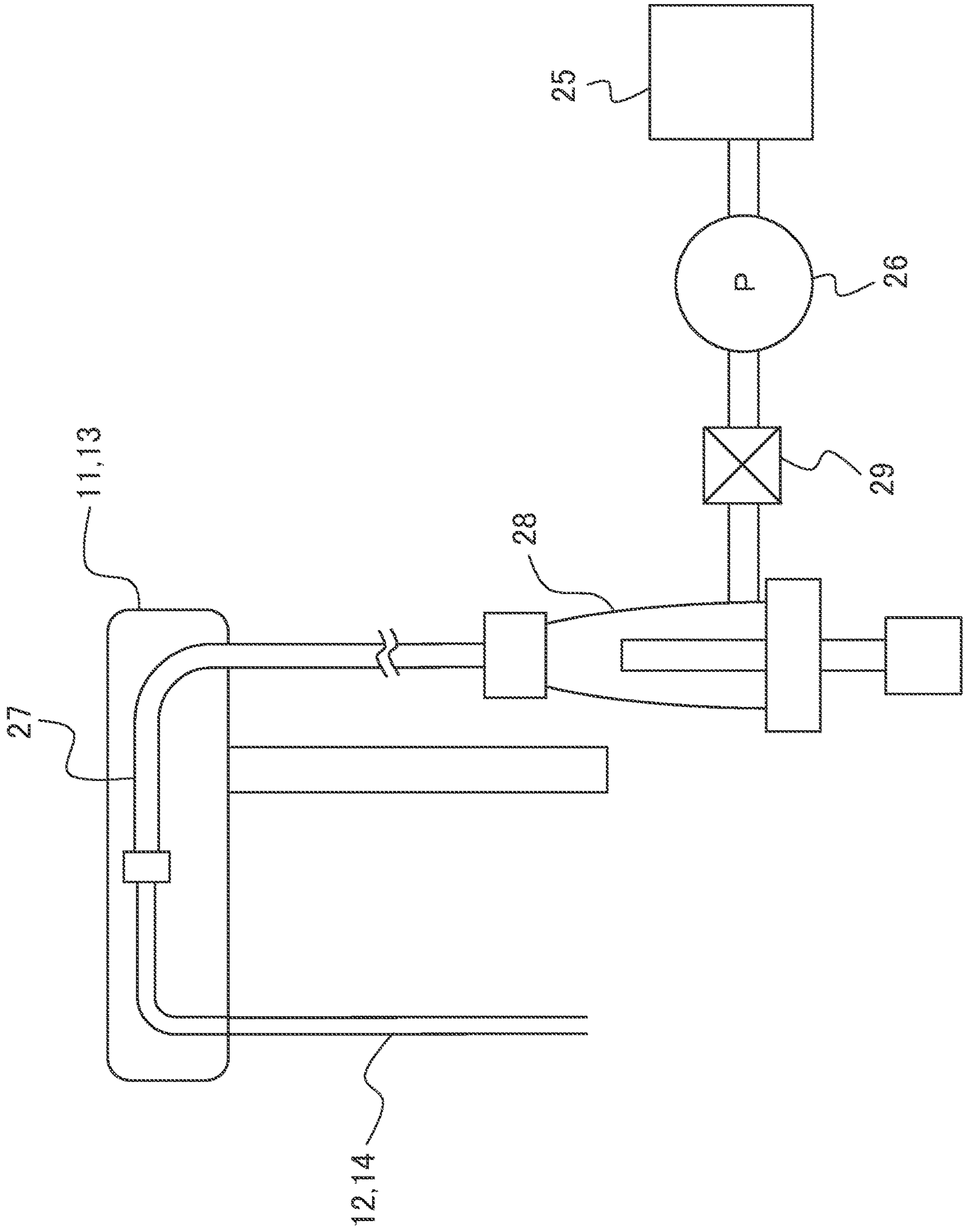
FIG. 4 is a schematic drawing of a dispensing mechanism of the automatic analyzer of the embodiment.

First, an overall configuration of the automatic analyzer will be described using FIGS. 1 to 4. FIG. 1 is an overview showing each of mechanisms in the automatic analyzer, and FIG. 2 is an overview showing the automatic analyzer when seen from the top. FIG. 3 is a schematic drawing showing a reagent container used in the automatic analyzer. FIG. 4 is a schematic drawing showing a dispensing mechanism.

An automatic analyzer 100 shown in FIGS. 1 and 2 is a device for mixing a sample such as blood and a reagent with each other to cause a reaction and measuring a property of the reacted reaction solution, and includes a reaction disk 1, a reagent disk 3, a sample transport mechanism 8, reagent dispensing mechanisms 11 and 13, a sample dispensing mechanism 9, a cleaning mechanism 15, a spectral photometer 16, stirring mechanisms 17 and 18, a sample nozzle cleaning tank 19, reagent nozzle cleaning tanks 20 and 21, stirring mechanism cleaning tanks 22 and 23, and a control computer 24.

In the reaction disk 1, a plurality of reaction containers 2 for mixing a sample and a reagent with each other to cause a reaction are arranged on a circumference. The circumference of the reaction container 2 is immersed in a reaction tank filled with a thermally conductive medium such as water of which the temperature is controlled to 37 degrees, and by circulating constant temperature water in a reaction tank 5, the temperature of the reaction container 2 is kept at about 37 degrees.

In the vicinity of the reaction disk 1 (reaction tank), the sample transport mechanism 8 that moves a rack 7 on which a sample container 6 containing a sample such as blood is loaded is provided.

The sample dispensing mechanism 9 capable of rotation and vertical movement is provided between the reaction disk 1 and the sample transport mechanism 8, and includes a sample nozzle 10. The sample nozzle 10 moves along an arc around a rotating shaft, and dispenses the sample into the reaction container 2 from the sample container 6 transported to a sample dispensing position by the sample transport mechanism 8.

In an operating range of the sample dispensing mechanism 9, the sample nozzle cleaning tank 19 where the sample nozzle 10 is cleaned with cleaning water and a cleaning container (not shown) cleaned with special cleaning water are disposed.

The reagent disk 3 has a structure in which a plurality of reagent containers 4 can be loaded on a circumference therein. The reagent disk 3 is kept cool and is covered with a cover provided at an aspiration port (not shown). The reagent container 4 is a container that is filled with the reagent used for the analysis of the sample.

FIG. 3 is a schematic drawing showing some configurations of the reagent container 4. Examples of the reagent container 4 include an one-reagent reagent container 4A having one space that stores the reagent, a two-reagent reagent container 4B having two spaces, and a three-reagent reagent container 4C having three spaces as shown in FIG. 3.

In addition, aspiration ports 4*a*, 4*b*, and 4*c* into which a reagent nozzles 12 and 14 are inserted to aspirate the reagent are provided above the spaces of each of the reagent containers 4.

In order to suppress the concentration of the reagent filled in the reagent container 4 or the contact of the reagent with the air, it is preferable that opening of the aspiration ports 4*a*, 4*b*, and 4*c* are as narrow as possible. For example, a method of narrowing the aspiration ports 4*b* and 4*c* toward the outer diameters of the reagent nozzles 12 and 14 or a method of forming a hole in a lid of the reagent container 4 and allowing the reagent nozzles 12 and 14 to pass through the hole can be adopted. In order to allow the reagent nozzles 12 and 14 to pass through the narrow aspiration port 4*a*, a shape where the circumference of the aspiration port 4*a* is tapered to facilitate the insertion into the aspiration port 4*a* can also be adopted.

More specifically, any of the opening portions of the reagent container 4 may have a plurality of shapes, and examples of the shapes include an inverse conical shape such as the aspiration port 4*a* where the width decreases toward the space storing the reagent and that is suitable for opening by a needle or the like and a cylindrical shape such as the aspiration ports 4*b* and 4*c* having slightly larger opening areas than cross-sectional areas of the reagent nozzles 12 and 14.

Returning to FIGS. 1 and 2, the reagent dispensing mechanisms 11 and 13 capable of rotation and vertical movement are provided between the reaction disk 1 and the reagent disk 3, and include the reagent nozzles 12 and 14. The reagent nozzles 12 and 14 move along an arc around a rotating shaft, access the reagent disk 3 from the aspiration port, and dispense the reagent from the reagent container 4 into the reaction container 2.

As shown in FIG. 4, the reagent dispensing mechanisms 11 and 13 each have a structure in which water is fed from a feed-water pump 25, is pressurized through a pressurization pump such as a gear pump 26, and is sent to a flow passage 27.

The entire flow passage is filled with pure water through the feed-water pump 25. A syringe pump 28 is disposed on the flow passage, and a solenoid valve 29 is disposed between the syringe pump 28 and the gear pump 26.

During the reagent dispensing, the solenoid valve 29 is in a closed state and has a structure in which the pressure of the syringe pump 28 is transmitted to tips of the reagent nozzles 12 and 14. During cleaning, the solenoid valve 29 is in an open state and transmits the pressure of the gear pump 26 to the tips of the reagent nozzles 12 and 14 such that the water in the reagent nozzles 12 and 14 is sent at a high pressure.

The sample dispensing mechanism 9 also has substantially the same configuration.

Returning to FIGS. 1 and 2, the reagent nozzle cleaning tanks 20 and 21 that clean the reagent nozzles 12 and 14 with cleaning water are disposed in operating ranges of the reagent dispensing mechanisms 11 and 13.

In the vicinity of the reaction disk 1, the stirring mechanisms 17 and 18 that stir the mixed liquid (reaction solution) of the sample and the reagent dispensed into the reaction container 2, the spectral photometer 16 that measures the absorbance or scattered light intensity of the reaction solution by measuring transmitted light obtained by light transmitting through the reaction solution in the reaction container 2 from a light source (not shown), the cleaning mechanism 15 that cleans the used reaction container 2, and the like are disposed.

The stirring mechanisms 17 and 18 are configured to be capable of rotation operation and vertical operation with respect to the horizontal direction, and are inserted into the reaction container 2 to stir the mixed liquid (reaction solution) of the sample and the reagent. In operating ranges of the stirring mechanisms 17 and 18, the stirring mechanism cleaning tanks 22 and 23 where the stirring mechanisms 17 and 18 are cleaned with cleaning water are disposed.

The control computer 24 is connected to the above-described devices in the automatic analyzer 100, and controls an operation of each of the devices and mechanisms in the automatic analyzer 100 including the reagent dispensing mechanisms 11 and 13. This control computer 24 is a computer including a CPU or a memory, and executes arithmetic processing of acquiring the concentration of a predetermined component in the sample based on the detection result of the spectral photometer 16.

In the present embodiment, the control computer 24 executes analysis while switching the reagent used according to an analysis item, and, when a predetermined condition is fulfilled during an analysis operation, controls the reagent dispensing mechanisms 11 and 13 to execute a conditioning operation of lowering the reagent nozzles 12 and 14 to pass through the aspiration ports 4*a*, 4*b*, and 4*c* of the target reagent container 4 and lifting the reagent nozzles 12 and 14. The details of this configuration will be described below.

The control of the operations of the devices by the control computer 24 is executed based on various programs recorded in a storage device. The storage device stores not only the various programs used for the measurement of the sample but also various parameters input through an input apparatus, information of a sample to be measured (for example, sample type information), the measurement result, and the like.

The control processes of the operations executed by the control computer 24 may be collectively executed by one program or may be executed individually by a plurality of programs, or a combination thereof may be adopted. In addition, some or all of the programs may be implemented by dedicated hardware or may be modularized.

The main configuration of the automatic analyzer 100 according to the present embodiment is as described above.

The configuration of the automatic analyzer 100 is not limited to the biochemical analyzer shown in FIG. 1 that analyzes an analysis item of biochemistry, and can be used as an analysis device that analyzes another analysis item, for example, an immunological analyzer that analyzes an analysis item of immunity. In addition, the biochemical analyzer is not limited to the configuration shown in FIG. 1, and an analysis device that measures another analysis item such as an electrolyte can be separately mounted thereon.

In addition, the automatic analyzer 100 is not limited to single analysis module configuration shown in FIG. 1, and a configuration in which two or more modules including analysis modules that can measure the same or different analysis items or pre-treatment modules that perform a pre-treatment are connected using a transport device can be adopted.

The analysis process of the above-described automatic analyzer 100 on the inspection sample is generally executed in the following order.

First, the sample in the sample container 6 loaded on the rack 7 that is transported to the vicinity of the reaction disk 1 by the sample transport mechanism 8 is dispensed into the reaction container 2 on the reaction disk 1 by the sample nozzle 10 of the sample dispensing mechanism 9. Next, the reagent used for the analysis is dispensed by the reagent dispensing mechanisms 11 and 13 from the reagent container 4 on the reagent disk 3 into the reaction container 2 into which the sample is previously dispensed. Next, the mixed liquid of the sample and the reagent in the reaction container 2 is stirred by the stirring mechanisms 17 and 18.

Next, light emitted from the light source is caused to transmit the reaction container 2 containing the stirred mixed liquid such that the light intensity of the transmitted light is measured by the spectral photometer 16. The light intensity measured by the spectral photometer 16 is transmitted to the control computer 24 through an A/D converter and an interface. By executing an operation with the control computer 24 to acquire the concentration of a predetermined component in a liquid sample such as blood or urine, the result is displayed by a display unit (not shown) or the like and is stored in a storage unit (not shown).

Next, a characteristic configuration of the present embodiment will be described using FIG. 5 and the subsequent drawings.

First, a mechanism of the adhesion of the reagent to be solved by the present invention will be described using FIG. 5. FIG. 5 is a schematic drawing of an abnormal value generation mechanism by the reagent adhesion.

Figures 5A, 5B, 5C, 5D, 5E:
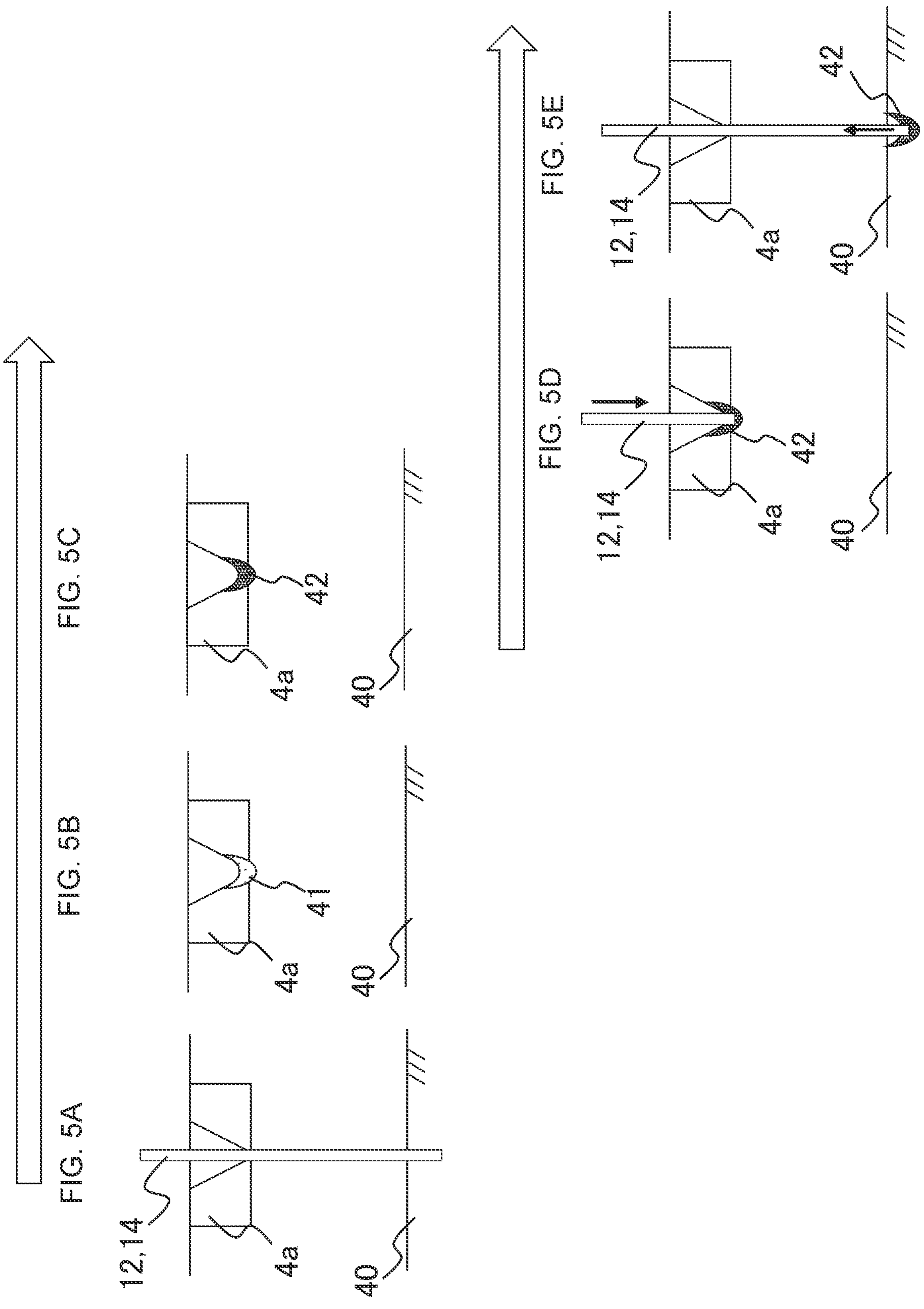
FIGS. 5A to 5E are schematic drawings of an abnormal value generation mechanism by adhesion of reagent.

The reagent container 4 is not limited to the shape having a narrow opening area as in the aspiration port 4*a* shown in FIG. 3. As shown in FIG. 5A, the reagent nozzles 12 and 14 are in contact with a reagent liquid level 40 during the reagent dispensing operation. At this time, the reagent is also attached to an outer circumferential side of a lower end portion of each of the reagent nozzles 12 and 14. Although the aspiration port 4*a* is described as an example, the same can be applied to the aspiration ports 4*b* and 4*c*.

In this state, the reagent nozzles 12 and 14 after the reagent aspiration are lifted to discharge the reagent into the reaction container 2. At this time, the reagent attached to the outer circumferential side of the lower end portion of the reagent nozzles 12 and 14 is attached to the circumference of the aspiration port 4*a* as shown in FIG. 5B.

Next, when a predetermined time is elapsed, a reagent 41 attached to the circumference of the aspiration port 4*a* is concentrated over time. The concentrated reagent adheres to the circumference of the aspiration port 4*a* as shown in FIG. 5C due to an increase in viscosity or precipitation (crystallization) of the component caused by an increase in the concentration of the component, and remains in the circumference of the aspiration port 4*a* as a solidified reagent 42.

In this state, when the next reagent aspiration is executed, the solidified reagent 42 may be attached to the tips of the reagent nozzles 12 and 14 as shown in FIG. 5D, and a part or all of the solidified reagent 42 may be aspirated during the aspiration of the reagent as shown in FIG. 5E.

In this state, when the next reagent aspiration or the discharge of the reagent into the reaction container 2 is executed, it is considered that a predetermined amount of the reagent cannot be dispensed such that the sample and the reagent react with each other at a speed different from an assumed rate, or the solidified reagent 42 is dissolved in the reaction solution such that the sample and the reagent react with each other at a speed different from an assumed rate. As a result, since the device acquires a value deviated from the original absorbance, the measured value cannot be appropriately calculated, and an unexpected abnormal value may be output. Therefore, the reagent dispensing accuracy deteriorates, and the abnormal value generation risk increases.

Next, in order to avoid the above-described phenomenon, the details of the configuration and the control for removing the effect of the adhered reagent will be described using FIG. 6 and the subsequent drawings.

Figure 10:
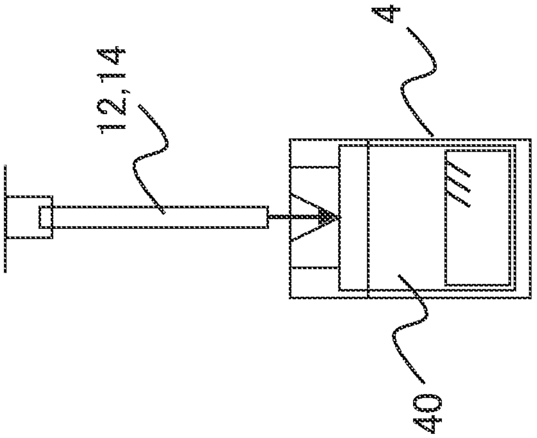
FIG. 10 is another schematic drawing of the first cycle of the highly effective conditioning operation of the automatic analyzer of the embodiment.

First, the operation for removing the reagent adhered to the aspiration port of the reagent container or for allowing the reagent concentration in the container to be uniform and the same as that during continuous measurement will be described using FIGS. 6 to 10. FIG. 6 is a basic schematic diagram showing the conditioning operation, FIG. 7 is a schematic drawing of a first cycle of a highly effective conditioning operation, FIG. 8 is a schematic drawing of a second cycle of the highly effective conditioning operation, and FIGS. 9 and 10 are other schematic diagrams showing the first cycle of the highly effective conditioning operation.

In the present invention, the operation for removing the reagent adhered to the aspiration ports 4*a*, 4*b*, and 4*c* of the reagent container 4 or for allowing the reagent concentration in the container to be uniform and the same as that during continuous measurement is executed using the reagent nozzles 12 and 14. In the following present specification, the removal operation is defined as the conditioning operation.

First, the basic conditioning operation will be described using FIG. 6. In the basic conditioning operation shown in FIG. 6, the reagent nozzles 12 and 14 are cleaned as shown in FIG. 6A as a first operation. This cleaning operation are executed by the reagent nozzle cleaning tanks 20 and 21.

Next, the reagent nozzles 12 and 14 are inserted into the aspiration ports 4*a*, 4*b*, and 4*c* of the reagent container 4 as shown in FIG. 6B as a second operation. At this time, it is desirable that the tips of the reagent nozzles 12 and 14 are in contact with the reagent liquid level 40. However, as long as the conditioning effect can be obtained, the tips of the reagent nozzles 12 and 14 do not need to be in contact with the reagent liquid level 40.

Next, the inserted reagent nozzles 12 and 14 are pulled out from the reagent container 4 as shown in FIG. 6C as a third operation.

Finally, the reagent nozzles 12 and 14 are cleaned as shown in FIG. 6D as a fourth operation. This cleaning operation is also executed by the reagent nozzle cleaning tanks 20 and 21.

This series of steps of FIGS. 6A to 6D are executed in one cycle of the typical dispensing cycle of the device. For example, in a device having a processing capacity of 1000 tests per hour, the time of one cycle is 3.6 seconds. Therefore, one cycle is executed within 3.6 seconds.

Here, as described above, when the reagent attached to the aspiration ports 4*a*, 4*b*, and 4*c* is concentrated and completely dried, the reagent becomes a solid such as powder or crystal. It is more difficult to uniformly remove the solidified reagent in the reagent nozzles 12 and 14 as compared to when the reagent is liquid. Accordingly, it is desirable to execute the highly effective conditioning where the effect of the basic conditioning is further improved. As one example of the highly effective conditioning, the summary will be described below using FIGS. 7 and 8.

It is desirable to execute the highly effective conditioning shown in FIGS. 7 and 8 using two cycles in total including one cycle of the dispensing cycle of the device in the step of FIG. 7 and one cycle in the step of FIG. 8.

The first cycle includes operations of FIGS. 7A to 7E, and FIGS. 7A, 7B, and 7E are the same as FIGS. 6A, 6B, and 6D, respectively.

Figures 7A, 7B, 7C, 7D, 7E:
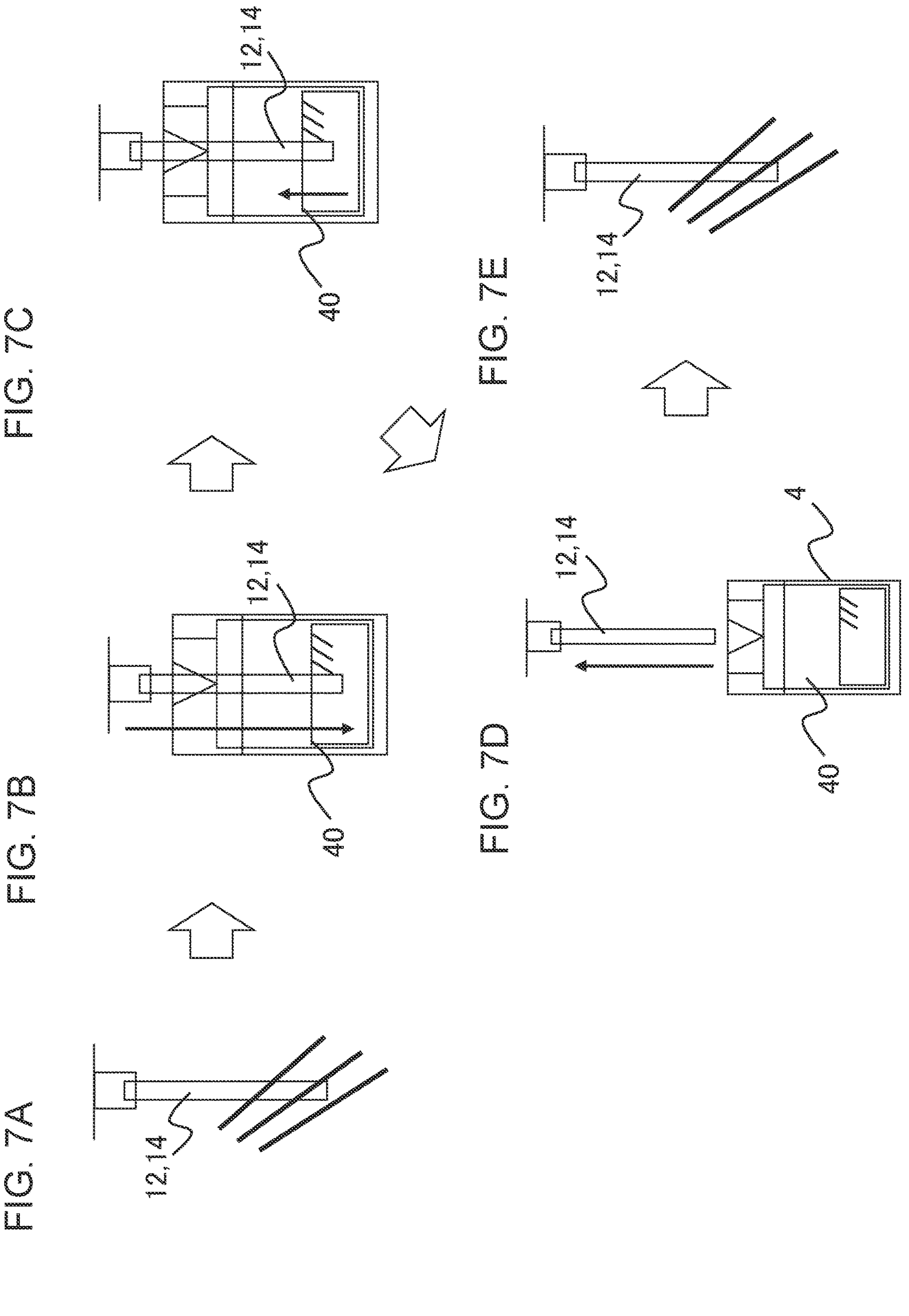
FIGS. 7A to 7E are schematic drawings of the first cycle of a highly effective conditioning operation of the automatic analyzer of the embodiment.

The differences are FIGS. 7C and 7D in which operations of attaching the reagent in the reagent container 4 to the reagent nozzles 12 and 14 to wet the aspiration ports 4*a*, 4*b*, and 4*c* are performed.

For example, as shown in FIG. 7C, by pulling out the reagent nozzles 12 and 14 at a high speed when the reagent nozzles 12 and 14 are lifted from the reagent liquid level 40, the reagent is likely to be attached to the circumference of the reagent nozzles 12 and 14. Next, as shown in FIG. 7D, by lifting the reagent nozzles 12 and 14 at a low speed when the reagent nozzles 12 and 14 pass through the aspiration ports 4*a*, 4*b*, and 4*c*, an operation of attaching the reagent actively attached to the reagent nozzles 12 and 14 to sides of the aspiration ports 4*a*, 4*b*, and 4*c* is executed. As a result, the solidified reagent 42 adhered to the aspiration ports 4*a*, 4*b*, and 4*c* can be dissolved again in the reagent.

The second cycle includes operations of FIGS. 8A to 8F, and FIGS. 8A, 8B, and 8F are the same as FIGS. 6A, 6B, and 6D, respectively.

The difference is that an operation of removing the dissolved reagent or making the concentration thereof uniform is executed.

Figures 8A, 8B, 8C, 8D, 8E, 8F:
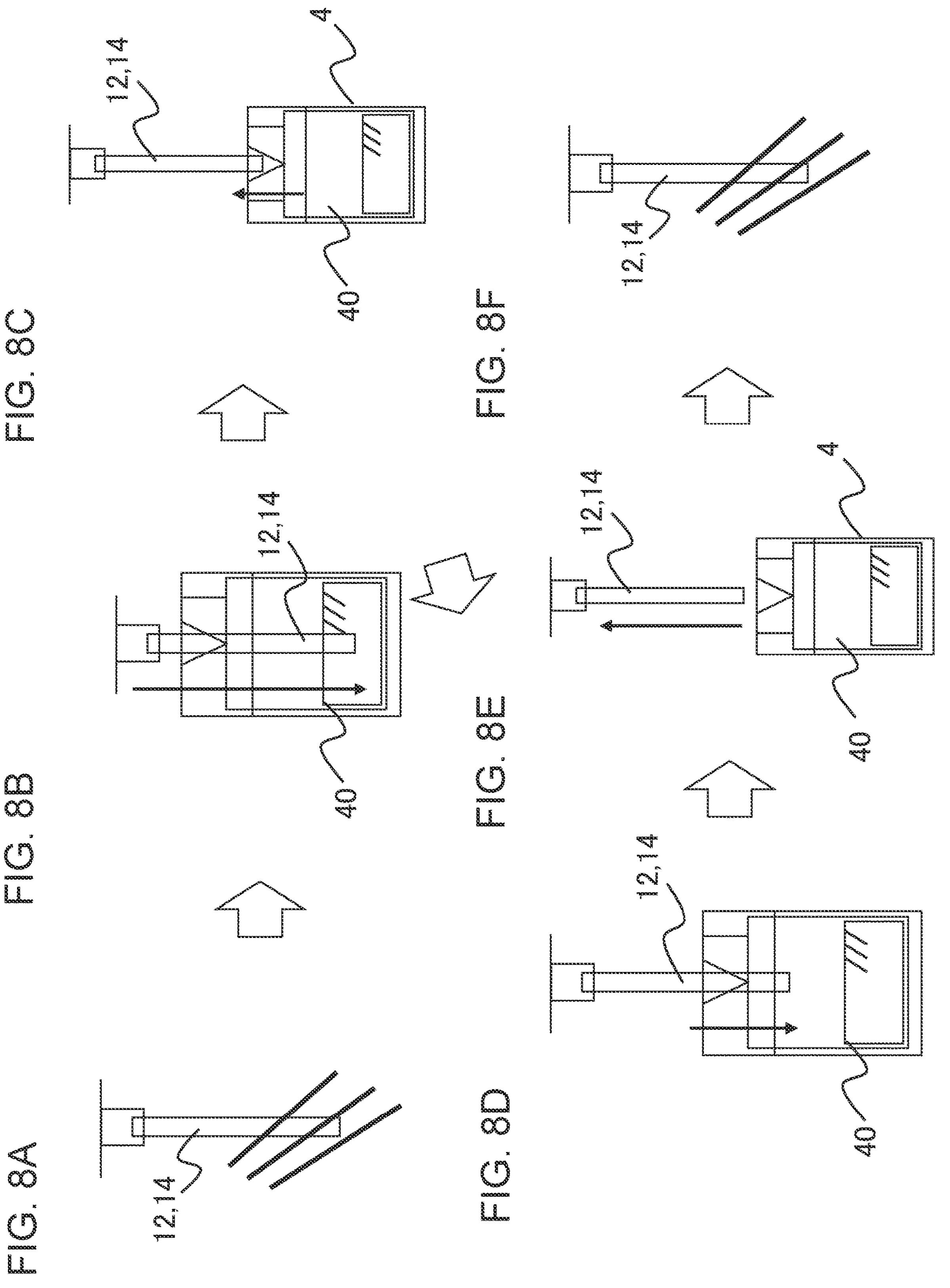
FIGS. 8A to 8F are schematic drawings of the second cycle of the highly effective conditioning operation of the automatic analyzer of the embodiment.
Figure 9:
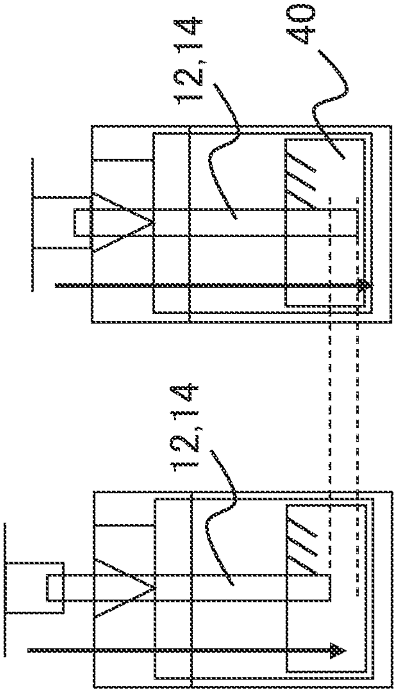
FIG. 9 is another schematic drawing of the first cycle of the highly effective conditioning operation of the automatic analyzer of the embodiment.

For example, as shown in FIG. 8B, in a pulling operation of FIG. 8C that is executed after once immersing the reagent nozzles 12 and 14 in the reagent in the reagent container, the pulling operation is temporarily stopped at the aspiration ports 4*a*, 4*b*, and 4*c*, the insertion operation is executed again up to below the aspiration ports 4*a*, 4*b*, and 4*c* as shown in FIG. 8D, and the reagent nozzles 12 and 14 are lifted again as shown in FIG. 8E.

In this way, by repeating the passage of the reagent nozzles 12 and 14 through the aspiration ports 4*a*, 4*b*, and 4*c*, the above-described dissolved reagent can be removed or the concentration thereof can be made uniform. As described above, after once immersing the reagent nozzles 12 and 14 in the reagent in the reagent container 4, the reagent nozzles 12 and 14 are allowed to pass through the aspiration ports 4*a*, 4*b*, and 4*c*. Therefore, the same effect as that of pre-washing can be obtained for the dissolved reagent in the aspiration ports 4*a*, 4*b*, and 4*c*.

In order to largely obtain the above-described effect, it is important to sufficiently wet the aspiration ports 4*a*, 4*b*, and 4*c* in the first cycle shown in FIG. 7 and to actively insert and pull over the reagent nozzles 12 and 14 in the second cycle shown in FIG. 8.

In addition, in order to ensure the immersion amount, it is considered to replace the first cycle in FIG. 7B with an operation where, when the reagent nozzles 12 and 14 are lowered to the reagent container 4 as shown in FIG. 9, the amount of the reagent nozzles 12 and 14 immersed in the reagent satisfies "analysis operation<conditioning".

Alternatively, as in FIG. 10 after the first cycle of FIG. 7D, it is considered to additionally execute the operation of actively wetting the aspiration ports 4*a*, 4*b*, and 4*c*, for example, to aspirate a small amount of reagent and to discharge the reagent to the aspiration ports 4*a*, 4*b*, and 4*c*.

FIGS. 6 to 10 show examples of the conditioning operation, and as long as the passage operations of the reagent nozzles 12 and 14 through the aspiration ports 4*a*, 4*b*, and 4*c* are executed, the operation content and the number of cycles required are not particularly limited.

Note that it is desirable to use two or more cycles as the dispensing cycle in the conditioning operation of FIG. 6 and the like. For example, the operation of FIG. 6 can be executed in two or more cycles or a conditioning operation including the two cycles of FIGS. 7 and 8 as one set can be executed in one or more sets.

When two or more cycles are executed, whether to execute the conditioning operation in all of cycles that are the same (the cycle of FIG. 6 is executed three or more times or the set of FIGS. 7 and 8 is executed two or more times) or in cycles one or more of which are different from the other cycles (the cycle of FIG. 6 is executed once or more and the set of FIGS. 7 and 8 is executed once or more) is not particularly limited.

Here, when the conditioning operation is executed in cycles one or more of which are different from the other cycles, the cycles can be selected depending on reagent items.

Next, a system control for executing the conditioning will be described using FIGS. 11 to 14. FIGS. 11 and 12 are diagrams showing an example of setting of conditioning information, and FIGS. 13 and 14 are diagrams showing an example of selection of conditioning operation timing information.

As described above, as a period of time when the reagent container 4 is not used increases, the reagent attached to the aspiration ports 4*a*, 4*b*, and 4*c* is concentrated such that the adhesion, of the reagent, which causes the risk of generating an abnormal value occurs.

Accordingly, the conditioning described in the present specification is controlled to be executed before the adhesion of the reagent, or even when the reagent is adhered, is controlled to be executed before the next use. Regarding information required for the conditioning and a control method of an execution timing, an example thereof will be described below.

The information setting of the conditioning shown in FIGS. 11 and 12 includes a reagent container identification code, an interval time, and a conditioning timing.

The reagent container identification code is a code for identifying the target reagent container and is defined as a reagent container associated with an analysis parameter and used for measuring a target item.

The interval time is set to a period of time required until the reagent attached to the aspiration ports 4*a*, 4*b*, and 4*c* enters a concentration state including the abnormal value generation risk after dispensing the target reagent. The interval time is set to a time in consideration of the concentration and drying time, for example, a predetermined time in a range of "10 to 1440 min".

The conditioning timing is defined as a timing at which the conditioning of the target reagent is executed. In the one-reagent reagent container 4A, the conditioning timing is a dispensing timing of a reagent (first reagent: R1) in the one-reagent reagent container 4A as shown in FIG. 11. In the two-reagent reagent container 4B or the three-reagent reagent container 4C, the conditioning timing is set depending on the reagent thereof as shown in FIG. 12. For example, the conditioning timing for a reagent of a position 1 is the dispensing timing of the first reagent, and the conditioning timing for a reagent of a position 2 is a dispensing timing of a third reagent: R3.

As the target reagent on which the conditioning operation is executed, a plurality of reagents, for example, the first reagent and the second reagent can be set to execute the conditioning, or among the first reagent and the second reagent, only a specific reagent that affects the analysis accuracy due to crystallization at the aspiration ports 4*a*, 4*b*, and 4*c* can be set.

As the information setting required for the conditioning, the one-reagent reagent container 4A where one container is filled with one reagent may be set as shown in FIG. 11, or the two-reagent reagent container 4B or the three-reagent reagent container 4C where each of a plurality of containers is filled with one reagent may be set as shown in FIG. 12. In FIG. 12, not only the above-described information but also information for identifying the associated container such as the position 1 or the position 2 of FIG. 12 are also added.

It is desirable that the information shown in FIG. 11 or 12 is stored in advance in, for example, the storage unit in the control computer 24. However, a configuration where the information is recorded in an RFID tag attached to the reagent container or a configuration where the control computer 24 acquires the information online from a reagent manufacturer or the like may be adopted.

The control computer 24 determines schedule selection information to confirm an operation sequence for executing the conditioning operation based on the information shown in FIG. 11 or 12.

FIGS. 13 and 14 are images showing the schedule selection information determination. The device schedules the conditioning operation as a 10-minute measurement sequence as in a typical analysis item. The device determines an R operation timing (R1/R2/R3) at which the conditioning is executed in the 10-minute measurement sequence based on the schedule selection information shown in FIG. 13 or 14.

Next, a conditioning timing control method using the above-described setting will be described using FIGS. 15 to 23.

Figure 15:
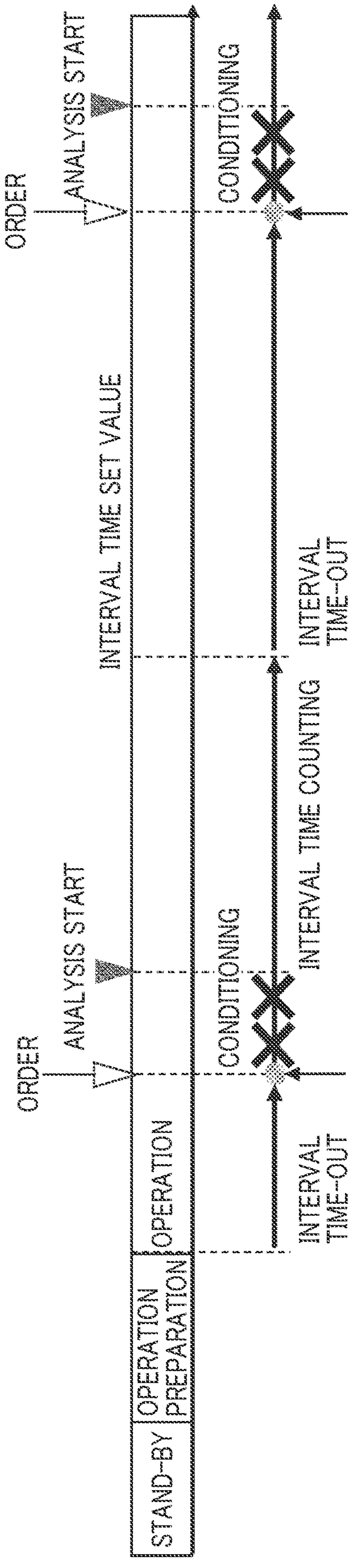
FIG. 15 is a drawing showing a summary of a control pattern A of conditioning control in the automatic analyzer of the embodiment.
Figure 16:
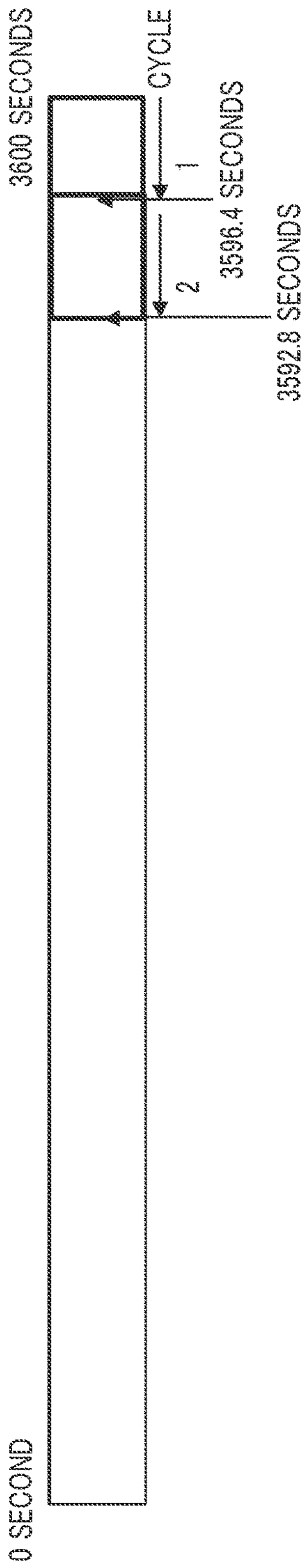
FIG. 16 is an image drawing of interval time counting in the automatic analyzer of the embodiment.
Figure 17:
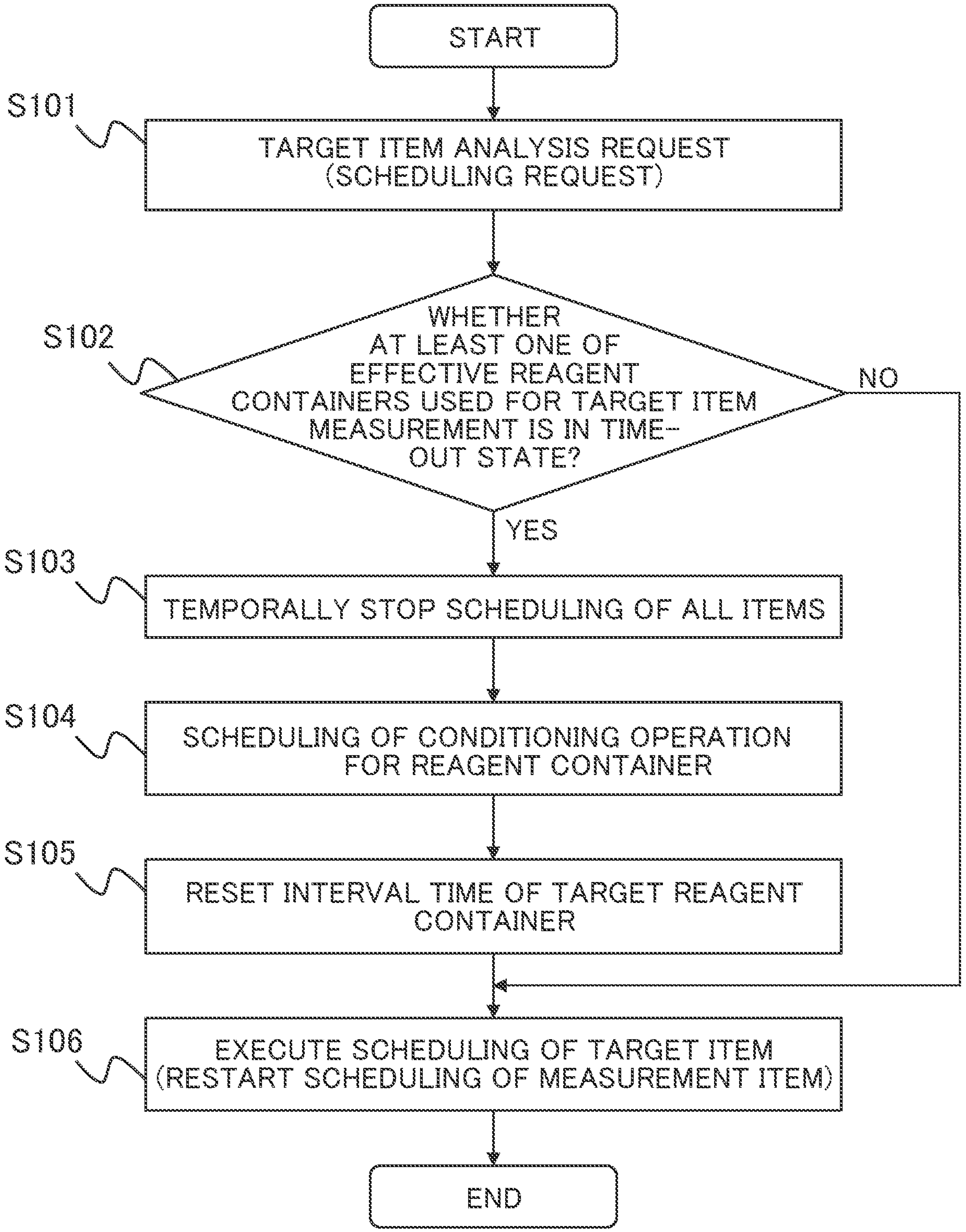
FIG. 17 is a flowchart of a conditioning operation by the control pattern A in the automatic analyzer of the embodiment.

First, a control pattern A as a first pattern will be described using FIGS. 15 to 17. FIG. 15 is a diagram showing the summary of the control pattern A of the conditioning control, FIG. 16 is an image showing interval time counting, and FIG. 17 is a flowchart showing the conditioning operation with the control pattern A.

In the control pattern A, a predetermined condition that is a trigger to execute the conditioning operation of lowering the reagent nozzles 12 and 14 to pass through the aspiration ports 4*a*, 4*b*, and 4*c* of the target reagent container 4 and lifting the reagent nozzles 12 and 14 is temporal information set for the specific reagent container 4, the temporal information being an elapsed time from execution completion of the conditioning operation or an elapsed time from planning completion of the conditioning operation for the target reagent and request information where the target reagent is used for analysis.

In FIG. 15, the device status shows transition from a stand-by state to an operation preparation operation and an operation. In addition, the status of the target reagent is also shown. In FIG. 15, time-out refers to a state where a time set as the interval time is exceeded.

In the control pattern A, when the automatic analyzer 100 is started up, the control computer 24 forcibly determines that the elapsed time is exceeded, and when the device transitions from the stand-by state to the operation preparation operation as shown in FIG. 15, the target reagent is already in the time-out state.

This control is strongly desired for a system where the interval time of the target reagent is not counted during the stand-by. When the interval time of the target reagent is counted during the stand-by, the control is not necessary.

In addition, as described above, in the control pattern A, even when the interval time is in the time-out state, the conditioning operation is not scheduled until a target item is ordered. That is, even in the time-out state, the order for the target item is required for scheduling.

When the target item is ordered while the target reagent is in the time-out state, the control computer 24 temporarily stops new analysis scheduling, and schedules the conditioning operation for the target reagent.

When the conditioning operation is scheduled, the time-out of the target reagent is released, the interval time counting of the target reagent is reset, and a new interval time starts to be counted.

FIG. 16 shows an example of the counting of the interval time. For example, if the processing capacity of the device is 1000 tests per hour and the interval time is set to 60 minutes, the counting is executed by subtracting 3.6 seconds from 3600 seconds for each device cycle.

Next, the flow of the time-out process with the control pattern A will be described using FIG. 17. The control computer 24 repeatedly executes the following conditioning control while the operation is continued.

As shown in FIG. 17, when the control computer 24 determines that the analysis of the target item is requested (Step S101), the control computer 24 determines whether or not at least one of the reagent containers 4 that are effectively used in the target item measurement is in the time-out state (Step S102).

When the control computer 24 determines that at least one of the reagent containers 4 is in the time-out state, the process proceeds to Step S103. On the other hand, when the control computer 24 determines that at least one of the reagent containers 4 is not in the time-out state, the process proceeds to Step S106, and the analysis of the target item is scheduled (Step S106). At this time, in the control pattern A, the counting of the interval time is continued as it is.

Next, the control computer 24 temporarily stops scheduling for all the items (Step S103), and schedules the conditioning operation for the reagent container 4 (Step S104).

Next, the control computer 24 resets the interval time of the target reagent container 4 (Step S105), and executes scheduling for the target measurement item (Step S106).

Figure 18:
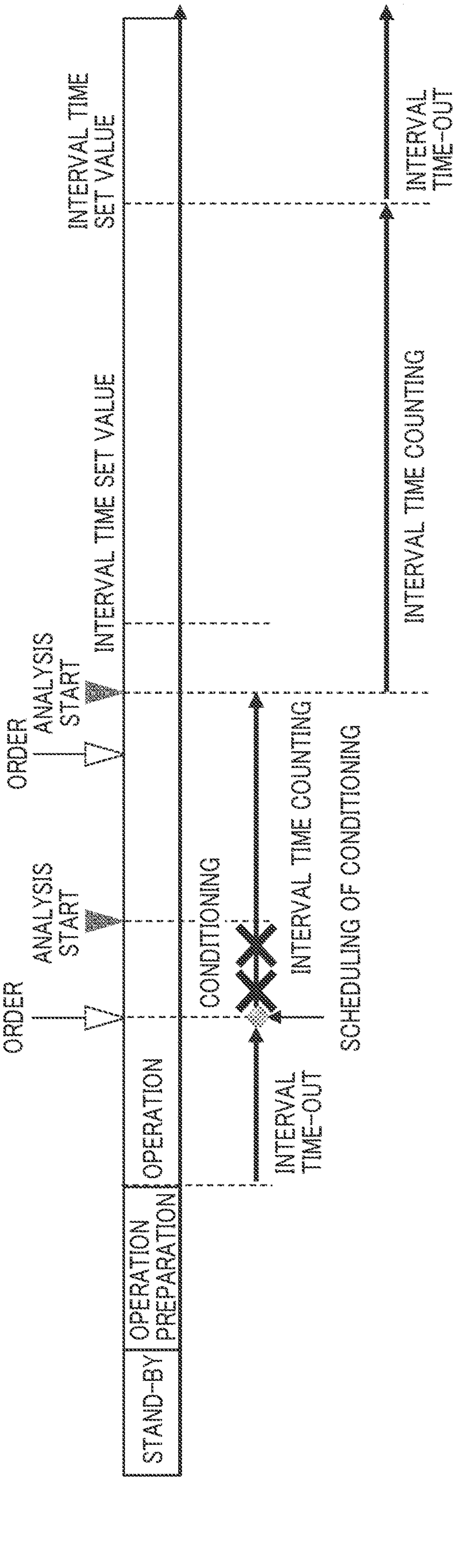
FIG. 18 is a drawing showing a summary of a control pattern A1 of conditioning control in the automatic analyzer of the embodiment.

Next, a control pattern A1 in the conditioning timing control will be described using FIG. 18. FIG. 18 is a diagram showing the summary of the control pattern A1 of the conditioning control.

The control pattern A1 is basically the same as the control pattern A, but the difference is that, as shown in FIG. 18, when the dispensing of the analysis item where the target reagent is used is executed at a timing at which the elapsed time is not exceeded, the counting of the interval time is reset, and a new elapsed time starts to be counted. The reset timing is the dispensing operation scheduling of the target reagent.

The flow of the control pattern A1 as well is basically the same as that of the control pattern A shown in FIG. 17, but the difference is that, when No is determined in Step S102, the process proceeds to Step S105 without proceeding to Step S106.

Figure 19:
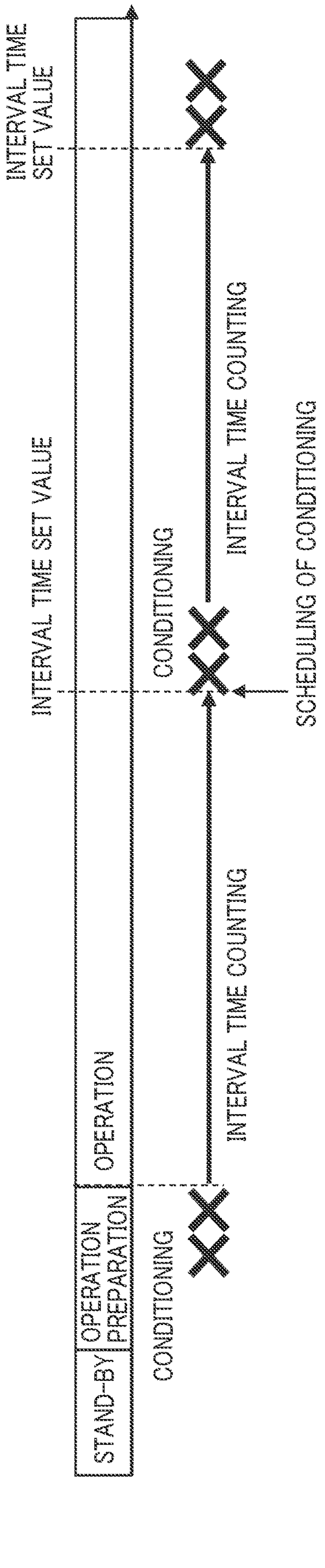
FIG. 19 is a drawing showing a summary of a control pattern B of conditioning control in the automatic analyzer of the embodiment.
Figure 20:
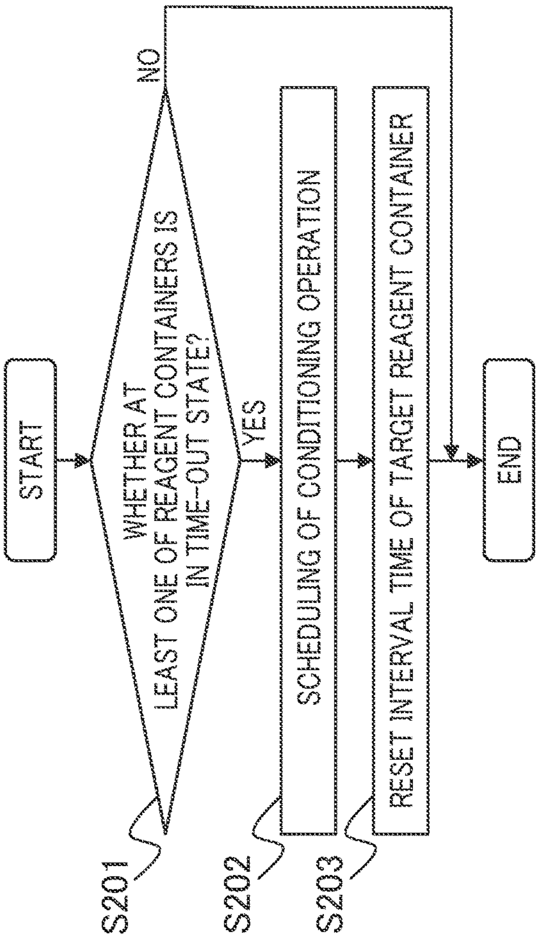
FIG. 20 is a flowchart of a conditioning operation by the control pattern B in the automatic analyzer of the embodiment.

Next, a control pattern B will be described using FIGS. 19 and 20. FIG. 19 is a diagram showing the summary of the control pattern B of the conditioning control, and FIG. 20 is a flowchart showing the conditioning operation with the control pattern B.

In the control pattern B, a predetermined condition that is a trigger to execute the conditioning operation of lowering the reagent nozzles 12 and 14 to pass through the aspiration ports 4*a*, 4*b*, and 4*c* of the target reagent container 4 and lifting the reagent nozzles 12 and 14 is temporal information set for the specific reagent container 4, the temporal information being an elapsed time from execution completion of the conditioning operation or an elapsed time from planning completion of the conditioning operation for the target reagent.

The difference of the control pattern B from the control pattern A is that the conditioning operation for the target reagent is scheduled at a timing at which the target reagent is in the time-out state irrespective of whether or not the analysis of the target reagent is requested. When the conditioning operation is scheduled, the time-out state is released, and a new interval time starts to be counted.

In addition, in the control pattern B, the conditioning of the target reagent is executed during the operation preparation. When a plurality of target reagents are present in the reagent disk 3, the conditioning operation is executed for all the reagents. When the device status transitions to the operation by executing the conditioning operation, the interval time of the target reagent starts to be counted. As a result, the conditioning operation that causes a cycle where the analysis cannot be executed can be completed during the preparation, and the analysis can start rapidly.

Next, the flow of the time-out process with the control pattern B will be described using FIG. 20. The control computer 24 repeatedly executes the following conditioning control while the operation is continued.

As shown in FIG. 20, firstly, the control computer 24 determines whether or not at least one of the reagent containers is in the time-out state (Step S201).

When the control computer 24 determines that at least one of the reagent containers is in the time-out state, the process proceeds to Step S202. On the other hand, when the control computer 24 determines that at least one of the reagent containers 4 is not in the time-out state, the process is completed.

Next, the control computer 24 not only temporarily stops scheduling for all the items, but also schedules the conditioning operation for the reagent container 4 (Step S202). Next, the control computer 24 resets the interval time of the target reagent container 4 (Step S203), and the process is completed.

Figure 21:
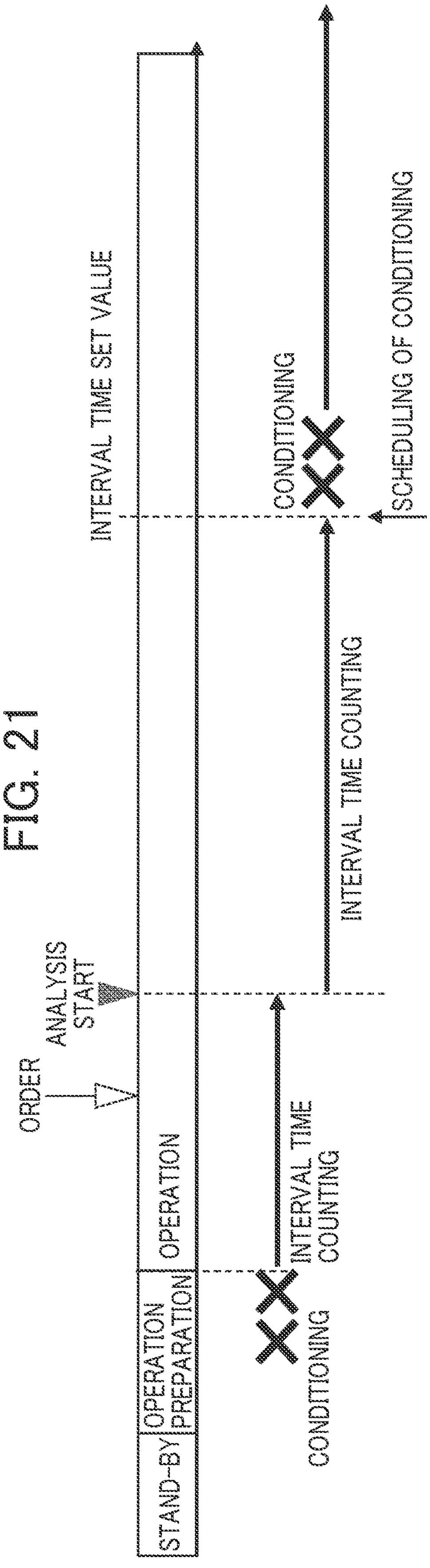
FIG. 21 is a drawing showing a summary of a control pattern B1 of conditioning control in the automatic analyzer of the embodiment.

Next, a control pattern B1 will be described using FIG. 21. FIG. 21 is a diagram showing the summary of the control pattern B1 of the conditioning control.

The control pattern B1 is basically the same as the control pattern B, and the conditioning operation for the target reagent is scheduled at a timing at which the target reagent is in the time-out state. However, the difference is that, as shown in FIG. 21, when the dispensing of the analysis item where the target reagent is used is executed before the elapsed time is not exceeded, the counting of the interval time is reset, and a new elapsed time starts to be counted. The reset timing is the dispensing operation scheduling of the target reagent.

The flow of the control pattern B1 is basically the same as that of the control pattern B shown in FIG. 20, but the difference is that, when No is determined in Step S201, the process proceeds to Step S203 without completing the process.

Figure 22:
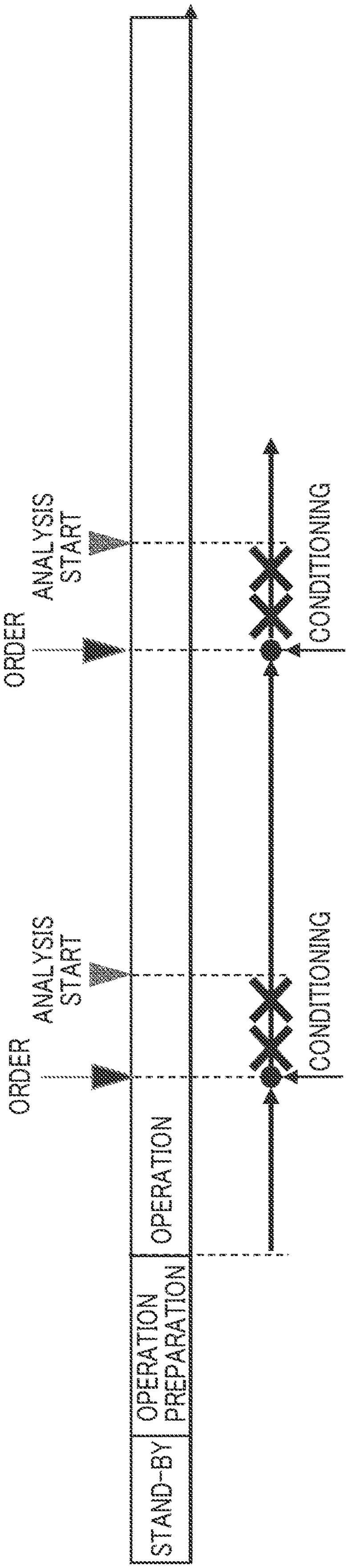
FIG. 22 is a drawing showing a summary of a control pattern C of conditioning control in the automatic analyzer of the embodiment.
Figure 23:
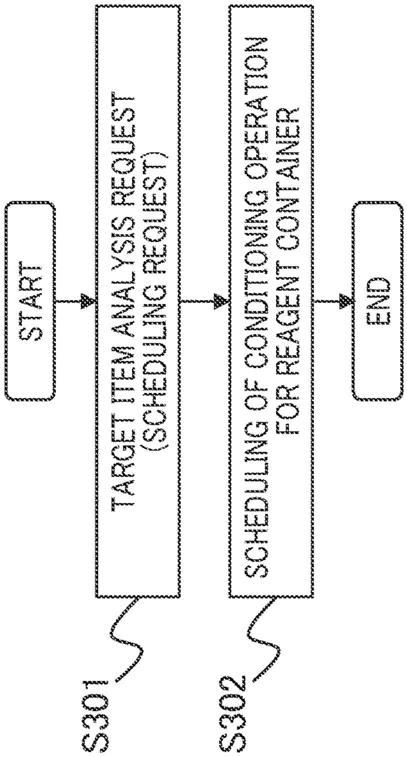
FIG. 23 is a flowchart of a conditioning operation by the control pattern C in the automatic analyzer of the embodiment.

Finally, a control pattern C will be described using FIGS. 22 and 23. FIG. 22 is a diagram showing the summary of the control pattern C of the conditioning control, and FIG. 23 is a flowchart showing the conditioning operation with the control pattern C.

In the control pattern C, a predetermined condition that is a trigger to execute the conditioning operation of lowering the reagent nozzles 12 and 14 to pass through the aspiration ports 4*a*, 4*b*, and 4*c* of the target reagent container 4 and lifting the reagent nozzles 12 and 14 is request information where the target reagent is used for analysis.

As shown in FIG. 22, in the control pattern C, whenever the target item is ordered, the conditioning operation is scheduled before the dispensing the target reagent. In the control pattern C, the conditioning operation is basically executed before dispensing. Therefore, the setting of the interval time in the control pattern A or the like is unnecessary.

Next, the flow of the process with the control pattern C will be described using FIG. 23. The control computer 24 repeatedly executes the following conditioning control while the operation is continued.

As shown in FIG. 23, firstly, when the control computer 24 determines that the analysis of the target item is requested (Step S301), the control computer 24 schedules the conditioning operation for the target reagent container 4 (Step S302), and completes the process.

Next, the effect of the embodiment will be described.

The automatic analyzer 100 according to the embodiment described above is a device allowing a sample and a reagent to react with each other and measuring a property of a reaction solution obtained by the reaction, the automatic analyzer including: reagent dispensing mechanisms 11 and 13 including reagent nozzles 12 and 14 that aspirate and discharge the reagent; the reagent disk 3 storing the reagent container 4 filled with the reagent; and the control computer 24 controlling operations of the reagent dispensing mechanisms 11 and 13, in which the control computer 24 executes analysis while switching the reagent used according to an analysis item, and, when a predetermined condition is fulfilled during an analysis operation, controls the reagent dispensing mechanisms 11 and 13 to execute a conditioning operation of lowering the reagent nozzles 12 and 14 to pass through an aspiration port of the target reagent container 4 and lifting the reagent nozzles 12 and 14.

Accordingly, in a container shape where the reagent is attached to the aspiration ports 4*a*, 4*b*, and 4*c*, even when a given interval is elapsed from the final dispensing, an effect of making the condition of the concentration of the reagent attached to the aspiration ports 4*a*, 4*b*, and 4*c* to be the same as that during continuous measurement before dispensing can be obtained. Therefore, a decrease in dispensing accuracy caused by an adhered or concentrated reagent during sample measurement can be reduced as compared to the related art, and data abnormality caused by the adhered reagent can be prevented. Accordingly, the effect of the loss in cycle on the device processing capacity can be significantly reduced, and thus the data reliability and the inspection speed can be simultaneously improved. Further, the conditioning operation is executed by the reagent nozzles 12 and 14 necessary for the analysis. Therefore, it is not necessary to provide a dedicated mechanism, and an increase in size of the device or a complex configuration can be prevented.

In addition, the predetermined condition is temporal information set for the specific reagent container 4. Therefore, an operation timing of the removal operation of the reagent component can be controlled, and the conditioning operation can be executed at a more appropriate timing.

Further, the predetermined condition is an elapsed time from execution completion of the conditioning operation or an elapsed time from planning completion of the conditioning operation for the target reagent and request information where the target reagent is used for analysis. As a result, the frequent execution of the conditioning can be suppressed, and an increase in time required to obtain the analysis result can be suppressed.

In addition, when the elapsed time is exceeded and dispensing of an analysis item where the target reagent is used is executed, a new elapsed time starts to be counted. As a result, the frequent execution of the conditioning can be suppressed, a timing for the conditioning can be ensured, and the reliable execution of the conditioning as a starting point can be implemented.

Further, when dispensing of an analysis item where the target reagent is used is executed in a case where the elapsed time is not exceeded, the counting of the elapsed time is continued without being reset. As a result, a complex execution control of the conditioning operation can be suppressed.

In addition, when dispensing of an analysis item where the target reagent is used is executed before the elapsed time is exceeded, a new elapsed time starts to be counted. As a result, while target reagent is being dispensed during the interval time counting, the target reagent is not in the time-out state, and thus the frequency of the conditioning operation can be reduced.

Further, the predetermined condition is an elapsed time from execution completion of the conditioning operation or an elapsed time from planning completion of the conditioning operation for the target reagent. As a result, the conditioning can be set to be reliably executed at a necessary timing.

In addition, when the automatic analyzer 100 is started up, the control computer 24 forcibly determines that the elapsed time is exceeded. As a result, when the power is turned off, it is not necessary to continue the counting, and the device configuration or control can be simplified.

Further, the predetermined condition is request information where the target reagent is used for analysis. As a result, the conditioning operation can be reliably executed before the analysis, the analysis accuracy can be ensured, and the reliability of the device can be improved.

In addition, the target reagent for which the conditioning operation is executed is a specific reagent that affects analysis accuracy due to crystallization at the aspiration port. As a result, the execution of the conditioning operation for all the reagents can be suppressed, the analysis can be rapidly executed by assigning most operations of the device to the analysis, and consumption of the reagent by the conditioning can also be reduced.

Further, two or more cycles are used as a dispensing cycle in the conditioning operation. As a result, the solidified reagent 42 can be reliably removed, and the effect of the conditioning can be reliably obtained.

In addition, the conditioning operation is the same in all the cycles. As a result, it is not necessary to increase the control pattern, and a complex conditioning control can be avoided.

Further, the conditioning operation varies in one or more cycles. As a result, a condition where operations for increasing the effect are appropriately mixed can be adopted, and a more effective conditioning can be executed.

<Others>

The present invention is not limited to the above-described embodiment, and various modifications and applications can be made. The embodiment has been described in detail in order to easily describe the present invention, and the present invention is not necessarily to include all the configurations described above.

REFERENCE SIGNS LIST

1: reaction disk
2: reaction container
3: reagent disk (storage)
4: reagent container
4A: one-reagent reagent container
4B: two-reagent reagent container
4C: three-reagent reagent container
4*a*, 4*b*, 4*c*: aspiration port
5: reaction tank
6: sample container
7: rack
8: sample transport mechanism
9: sample dispensing mechanism
10: sample nozzle
11, 13: reagent dispensing mechanism
12, 14: reagent nozzle
15: cleaning mechanism
16: spectral photometer
17, 18: stirring mechanism
19: sample nozzle cleaning tank
20, 21: reagent nozzle cleaning tank
22, 23: stirring mechanism cleaning tank
24: control computer (control unit)
25: feed-water pump
26: gear pump
27: flow passage
28: syringe pump
29: solenoid valve
40: reagent liquid level
41: reagent
42: solidified reagent
100: automatic analyzer

The invention claimed is:

1. An automatic analyzer allowing a sample and a reagent to react with each other and measuring a property of a reaction solution obtained by the reaction, the automatic analyzer comprising:

a dispensing mechanism including a nozzle that aspirates and discharges the reagent;

a storage storing a reagent container filled with the reagent; and a control unit controlling an operation of the dispensing mechanism, wherein the control unit is programmed to execute analysis, wherein the reagent is switched according to an analysis item, and, when a predetermined condition is fulfilled during an analysis operation, controls the dispensing mechanism to execute a conditioning operation of lowering the nozzle to pass through an aspiration port of the reagent container of a target and lifting the nozzle, and the predetermined condition is temporal information set to the reagent container specified.

2. The automatic analyzer according to claim 1, wherein the predetermined condition is a first elapsed time from execution completion of the conditioning operation or a second elapsed time from planning completion of the conditioning operation with respect to the reagent of a target and request information of using the reagent of a target for analysis.

3. The automatic analyzer according to claim 2, wherein when the first or second elapsed time is exceeded and dispensing of an analysis item using the reagent of a target is to be executed, counting of a new elapsed time is started.

4. The automatic analyzer according to claim 2, wherein when dispensing of an analysis item using the reagent of a target is to be executed in a case the first or second elapsed time is exceeded, counting of elapsed time is continued without being reset.

5. The automatic analyzer according to claim 2, wherein when dispensing of an analysis item using the reagent of a target is to be executed before the first or second elapsed time is exceeded, counting of new elapsed time is started.

6. The automatic analyzer according to claim 2, wherein when the automatic analyzer is started up, the control unit forcibly regards that the first or second elapsed time is exceeded.

7. The automatic analyzer according to claim 1, wherein the predetermined condition is a first elapsed time from execution completion of the conditioning operation or a second elapsed time from planning completion of the conditioning operation with respect to the reagent of a target.

8. The automatic analyzer according to claim 7, wherein when the automatic analyzer is started up, the control unit forcibly regards that the first or second elapsed time is exceeded.

9. The automatic analyzer according to claim 1, wherein the predetermined condition is request information of using the reagent of a target for analysis.

10. The automatic analyzer according to claim 1, wherein the reagent of a target of execution of the conditioning operation is a predetermined reagent in which analysis accuracy is affected by crystallization at the aspiration port.

11. The automatic analyzer according to claim 1, wherein the conditioning operation comprises a plurality of dispensing cycles.

12. The automatic analyzer according to claim 11, wherein the conditioning operation is the same in all the dispensing cycles.

13. The automatic analyzer according to claim 11, wherein the conditioning operation is different in one or more of the dispensing cycles.

* * * * *